United States Patent
Ajisaka

(10) Patent No.: US 11,752,886 B2
(45) Date of Patent: Sep. 12, 2023

(54) VEHICLE INSTALLATION STRUCTURE AND VEHICLE INSTALLATION METHOD FOR FUEL CELL STACK

(71) Applicant: TOYOTA JIDOSHA KABUSHIKI KAISHA, Aichi-ken (JP)

(72) Inventor: Satoshi Ajisaka, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 482 days.

(21) Appl. No.: 17/006,754

(22) Filed: Aug. 28, 2020

(65) Prior Publication Data

US 2021/0078414 A1 Mar. 18, 2021

(30) Foreign Application Priority Data

Sep. 17, 2019 (JP) ................................. 2019-168405

(51) Int. Cl.
*B60L 50/71* (2019.01)
*B62D 65/10* (2006.01)
*B62D 21/11* (2006.01)

(52) U.S. Cl.
CPC .............. *B60L 50/71* (2019.02); *B62D 21/11* (2013.01); *B62D 65/10* (2013.01)

(58) Field of Classification Search
CPC .......... B60L 50/71; B62D 21/11; B62D 65/10
See application file for complete search history.

(56) References Cited

U.S. PATENT DOCUMENTS

| | | | | |
|---|---|---|---|---|
| 9,079,508 | B2* | 7/2015 | Naito | ...................... B60L 1/003 |
| 9,902,249 | B2* | 2/2018 | Nagaosa | .................. B60K 1/00 |
| 2002/0189873 | A1 | 12/2002 | Mizuno | |
| 2012/0199437 | A1 | 8/2012 | Okuda | |
| 2013/0333965 | A1* | 12/2013 | Kobayashi | .............. B60L 50/71 |
| | | | | 180/65.31 |
| 2014/0335434 | A1* | 11/2014 | Ikeya | ...................... B60L 50/71 |
| | | | | 429/435 |
| 2018/0170211 | A1 | 6/2018 | Yoshikawa et al. | |
| 2020/0047808 | A1* | 2/2020 | Ajisaka | ................ B62D 21/157 |
| 2020/0321646 | A1* | 10/2020 | Naito | ...................... B60L 50/72 |

(Continued)

FOREIGN PATENT DOCUMENTS

| | | |
|---|---|---|
| JP | 2002370544 A | 12/2002 |
| JP | 2005130545 A | 5/2005 |
| JP | 2009190438 A | 8/2009 |

(Continued)

*Primary Examiner* — Jacob B Meyer
(74) *Attorney, Agent, or Firm* — HAUPTMAN HAM, LLP

(57) ABSTRACT

A vehicle installation structure for a fuel cell stack that includes: a framework member disposed at a vehicle lower side; a fuel cell stack that is disposed at a vehicle front section or a vehicle rear section, and that is elastically supported by the framework member via a vibration isolating member; and a drive motor that is disposed at a same section of the vehicle front section or the vehicle rear section as the fuel cell stack, that is separate from the fuel cell stack, and that is elastically supported by the framework member via a vibration isolating member such that a height position of at least one of an upper end, a lower end, or a height direction center of the drive motor is disposed between a height position of an upper end and a height position of a lower end of the fuel cell stack.

10 Claims, 8 Drawing Sheets

(56) References Cited

U.S. PATENT DOCUMENTS

| | | | |
|---|---|---|---|
| 2021/0078414 A1* | 3/2021 | Ajisaka | B60L 50/71 |
| 2022/0274492 A1* | 9/2022 | Naito | H01M 8/2475 |

FOREIGN PATENT DOCUMENTS

| | | | |
|---|---|---|---|
| JP | 201256493 A | | 3/2012 |
| JP | 2012206582 A | | 10/2012 |
| JP | 201899918 A | | 6/2018 |
| JP | 2019147550 A | | 9/2019 |
| JP | 2019188884 A | * | 10/2019 |
| KR | 1020100058165 A | | 6/2010 |
| KR | 1020120057650 A | | 6/2012 |
| KR | 101511560 B1 | | 4/2015 |

* cited by examiner

VEHICLE INSTALLATION STRUCTURE AND VEHICLE INSTALLATION METHOD FOR FUEL CELL STACK

CROSS-REFERENCE TO RELATED APPLICATION

This application is based on and claims priority under 35 USC 119 from Japanese Patent Application No. 2019-168405 filed on Sep. 17, 2019, the disclosure of which is incorporated by reference herein.

BACKGROUND

Technical Field

The present disclosure relates to a vehicle installation structure and a vehicle installation method for a fuel cell stack.

Related Art

Japanese Patent Application Laid-Open (JP-A) No. 2009-190438 discloses a vehicle structure in which a fuel cell is installed above a drive motor in a vehicle. In this vehicle structure, the fuel cell is installed so as to straddle a pair of left and right side members provided in a vehicle front section. The drive motor is disposed toward the vehicle lower side so as not to impinge on the fuel cell.

However, in the configuration of JP-A No. 2009-190438, the fuel cell is disposed further toward the vehicle upper side than an upper end of a drive motor, thus increasing the overall height of a motor room (power unit compartment). Since this constrains the degrees of freedom for stylistic design of the vehicle, there is accordingly room for improvement from the perspective of stylistic design.

SUMMARY

In consideration of the above circumstances, an object of the present disclosure is to obtain a vehicle installation structure and a vehicle installation method for a fuel cell stack that are capable of improving the degrees of freedom for stylistic design of a vehicle while suppressing the height of a power unit compartment.

A first aspect of the present disclosure provides a vehicle installation structure for a fuel cell stack, the vehicle installation structure including: a framework member that is disposed at a vehicle lower side; a fuel cell stack that is disposed at a vehicle front section or a vehicle rear section, and that is elastically supported by the framework member via a vibration isolating member; and a drive motor that is disposed at a same section of the vehicle front section or the vehicle rear section as the fuel cell stack, that is separate from the fuel cell stack, and that is elastically supported by the framework member via a second vibration isolating member such that a height position of at least one of an upper end, a lower end, or a height direction center of the drive motor is disposed between a height position of an upper end and a height position of a lower end of the fuel cell stack.

In the fuel cell stack vehicle installation structure according to the first aspect, through the vibration isolating members, the fuel cell stack and the drive motor disposed in either the vehicle front section or the vehicle rear section are elastically supported by the framework member disposed at the vehicle lower side. The fuel cell stack and the drive motor are configured separately to each other. The height position of at least one out of the upper end, the lower end, or the height direction center of the drive motor is disposed between the height position of the upper end and the height position of the lower end of the fuel cell stack. Accordingly, the height of a power unit compartment can be suppressed in comparison to configurations in which the fuel cell stack is disposed further toward the vehicle upper side than the upper end of the drive motor. This enables the degrees of freedom for stylistic design of the vehicle to be improved as a result. Note that the "height positions" referred to here are height direction positions as measured from a ground contact face of a tire when the fuel cell stack and the drive motor have been installed to the vehicle.

A fuel cell stack vehicle installation structure according to a second aspect is the first aspect, wherein: the framework member includes a pair of left and right lower side members extending along a vehicle front-rear direction, and a lower cross member coupling the pair of lower side members together in a vehicle width direction, and the fuel cell stack and the drive motor are elastically supported by the lower cross member via the respective vibration isolating members.

In the fuel cell stack vehicle installation structure according to the second aspect, the framework member is configured including the pair of left and right lower side members extending along the vehicle front-rear direction, and the lower cross member coupling the pair of lower side members together in the vehicle width direction. Through the respective vibration isolating members, the fuel cell stack and the drive motor are elastically supported by the lower cross member extending in the vehicle width direction. This enables high support rigidity to be obtained with respect to vibration in the vehicle front-rear direction.

A fuel cell stack vehicle installation structure according to a third aspect is either the first aspect or the second aspect, further including a pair of left and right upper side members located further toward a vehicle upper side than the framework member and extending in a vehicle front-rear direction, wherein at least one of the fuel cell stack or the drive motor is elastically supported by the pair of left and right upper side members via a third vibration isolating member.

In the fuel cell stack vehicle installation structure according to the third aspect, the pair of left and right upper side members are located further toward the vehicle upper side than the framework member and extend along the vehicle front-rear direction, and at least one out of the fuel cell stack or the drive motor is elastically supported by the pair of upper side members through the vibration isolating member. This enables high support rigidity to be obtained with respect to vibration in the vehicle width direction.

A fuel cell stack vehicle installation structure according to a fourth aspect is any one of the first aspect to the third aspect, wherein: the framework member includes a suspension member, and a vehicle front-rear direction inner side end portion of the fuel cell stack and a vehicle front-rear direction inner side end portion of the drive motor are elastically supported by the suspension member via the respective vibration isolating members.

In the fuel cell stack vehicle installation structure according to the fourth aspect, the vehicle front-rear direction inner side end portions of the fuel cell stack and the drive motor are elastically supported by the suspension member configuring part of the framework member through the vibration isolating members. There is therefore no need to provide an additional component to support the vehicle front-rear direction inner side end portion of the fuel cell stack. This enables high support rigidity to be obtained with respect to vibration in the vehicle front-rear direction without increasing the number of components.

A fuel cell stack vehicle installation structure according to a fifth aspect is the first aspect, wherein the framework member is a frame of a body-on-frame type vehicle, the fuel cell stack is disposed at a front section of the frame, and the drive motor is disposed further toward a vehicle rear side than the fuel cell stack.

In the fuel cell stack vehicle installation structure according to the fifth aspect, the framework member is configured by the frame of the body-on-frame type vehicle. The fuel cell stack is disposed in the front section of the frame, and the drive motor is disposed further toward the vehicle rear side than the fuel cell stack. This enables the height of the power unit chamber to be suppressed in comparison to configurations in which a fuel cell stack is disposed further toward the vehicle upper side than an upper end of the drive motor, and also enables the degrees of freedom for stylistic design of the vehicle to be improved in a body-on-frame type vehicle.

A fuel cell stack vehicle installation structure according to a sixth aspect is the fifth aspect, wherein: the frame includes a pair of left and right side rails extending along a vehicle front-rear direction and a cross member coupling the pair of side rails together in a vehicle width direction, and the fuel cell stack and the drive motor are elastically supported by the cross member via the respective vibration isolating members.

In the fuel cell stack vehicle installation structure according to the sixth aspect, the frame includes the pair of left and right side rails extending along the vehicle front-rear direction and the cross member coupling the pair of side rails together in the vehicle width direction. The fuel cell stack and the drive motor are elastically supported by the cross member through the respective vibration isolating members, enabling high support rigidity to be obtained with respect to vibration in the vehicle front-rear direction.

A seventh aspect of the present disclosure is a method for installing a fuel cell stack at a vehicle including:
i) attaching a fuel cell stack and a drive motor to a framework member via a vibration isolating member such that a height position of at least one of an upper end, a lower end, or a height direction center of the drive motor is disposed between a height position of an upper end and a height position of a lower end of the fuel cell stack;
ii) attaching the framework member to which the fuel cell stack and the drive motor are attached to a vehicle body from a vehicle lower side; and
iii) attaching the fuel cell stack and the drive motor, respectively, to the vehicle body via a second vibration isolating member.

In the fuel cell stack vehicle installation method according to the seventh aspect, the fuel cell stack and the drive motor are attached to the framework member through the vibration isolating member such that the height position of at least one out of the upper end, the lower end, or the height direction center of the drive motor is disposed between the height position of the upper end and the height position of the lower end of the fuel cell stack. This enables the degrees of freedom for stylistic design of the vehicle to be improved while suppressing the height of a power unit compartment in comparison to cases in which a fuel cell stack is disposed further toward the upper side than the upper end of a drive motor. Note that the "height positions" referred to here are height direction positions as measured from a ground contact face of a tire when the fuel cell stack and the drive motor have been installed to the vehicle.

The framework member to which the fuel cell stack and the drive motor are attached is attached to the vehicle body from the vehicle lower side. The fuel cell stack and the drive motor are also respectively attached to the vehicle body through the vibration isolating member. Since the framework member to which the fuel cell stack and the drive motor are attached is attached to the vehicle body from the vehicle lower side similarly to in a traditional gasoline-powered or hybrid vehicle, it is possible to employ a traditional vehicle production line for mixed production including fuel cell vehicles.

A fuel cell stack vehicle installation method according to an eighth aspect is the seventh aspect, wherein:
the framework member includes a pair of left and right lower side members extending along a vehicle front-rear direction when fixed to the vehicle body, a lower cross member coupling the pair of lower side members together in a vehicle width direction, and a suspension member fixed to vehicle front-rear direction inner side end portions of the pair of left and right lower side members, and
attaching the fuel cell stack and the drive motor to the framework member via the vibration isolating member includes:
a) attaching the fuel cell stack to the lower cross member and the suspension member via the vibration isolating member; and
b) attaching the drive motor to the lower cross member and the suspension member via the vibration isolating member.

In the fuel cell stack vehicle installation method according to the eighth aspect, the framework member includes the pair of left and right lower side members extending along the vehicle front-rear direction when fixed to the vehicle body, the lower cross member coupling the pair of lower side members together in the vehicle width direction, and the suspension member fixed to the vehicle front-rear direction inner side end portions of the pair of left and right lower side members. The fuel cell stack and the drive motor are respectively attached to the lower cross member and the suspension member through a vibration isolating member. In this method, since the fuel cell stack and the drive motor are respectively attached to the lower cross member and the suspension member that extend in the vehicle width direction in the framework member that is configured in a shape resembling a hashtag, the framework member to which the fuel cell stack and the drive motor are attached can be more rigidly attached to the vehicle body.

A fuel cell stack vehicle installation method according to a ninth aspect is either the seventh aspect or the eighth aspect, wherein attaching the fuel cell stack and the drive motor to the vehicle body via the vibration isolating member includes:
c) attaching the fuel cell stack and the drive motor to each of a pair of left and right upper side members via the vibration isolating member, the pair of left and right upper side members being located further toward a vehicle upper side than the framework member and extending along a vehicle front-rear direction.

In the fuel cell stack vehicle installation method according to the ninth exemplary embodiment, the fuel cell stack and the drive motor are attached to the pair of upper side members through the vibration isolating member, thereby enabling the attachment state to be visually inspected from the vehicle upper side.

As described above, the vehicle installation structure and the vehicle installation method for a fuel cell stack according to the present disclosure are capable of improving the degrees of freedom for stylistic design of the vehicle while suppressing the height of the power unit compartment.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
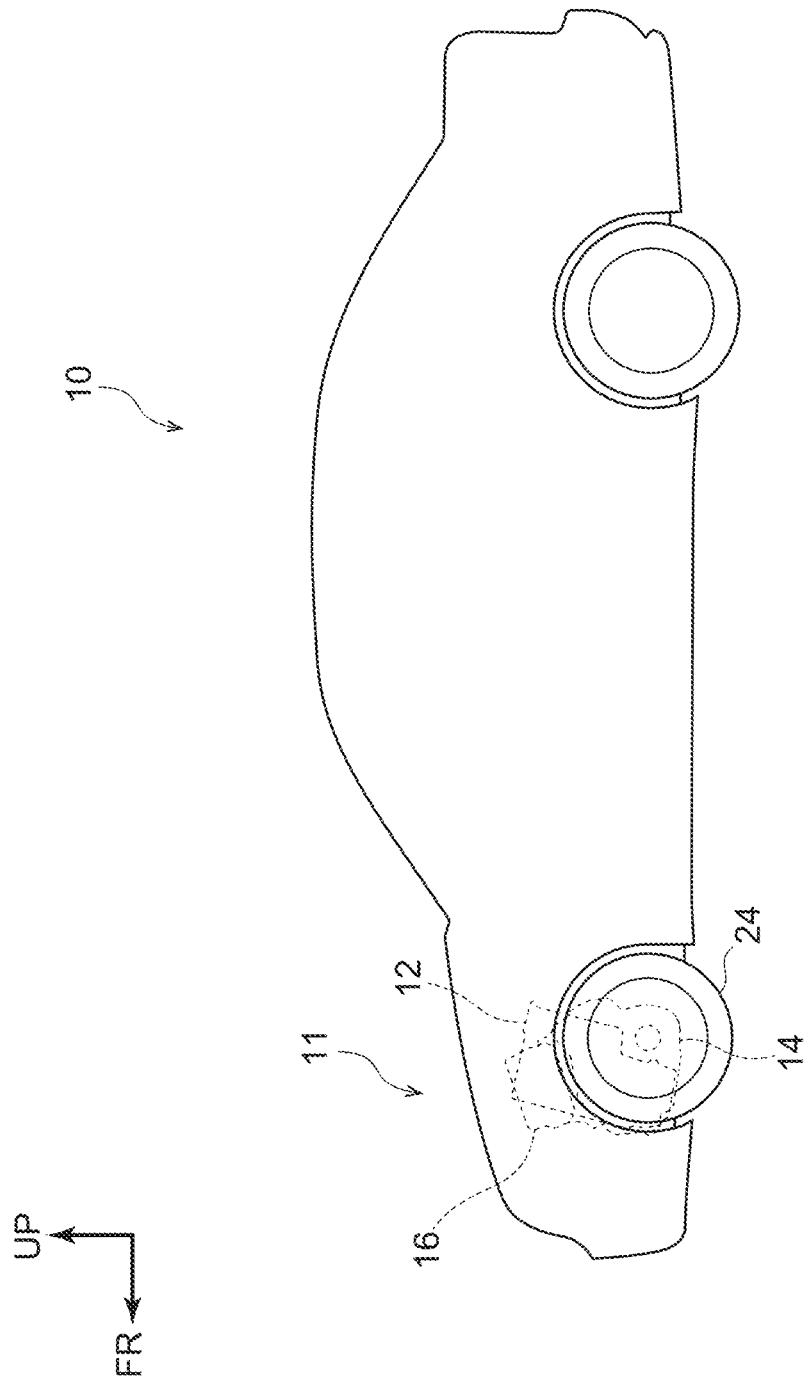
FIG. 1 is a schematic view illustrating a vehicle applied with a fuel cell stack vehicle installation structure according to a first exemplary embodiment.

Explanation follows regarding a first exemplary embodiment, with reference to FIG. 1 to FIG. 5. In the drawings, the arrow FR indicates a vehicle front side, the arrow UP indicates a vehicle upper side, and the arrow RH indicates a vehicle right hand side when facing in a direction of travel, as appropriate. Unless specifically stated otherwise, in the following explanation reference to the front and rear, upward and downward, and left and right directions refers to front and rear in a vehicle front-rear direction, upward and downward in a vehicle vertical direction, and left and right when facing in the direction of travel.

Overall Configuration of Vehicle

As illustrated in FIG. 1, a vehicle 10 applied with a fuel cell stack vehicle installation structure according to the first exemplary embodiment is a fuel cell vehicle configured including a fuel cell stack 12 (referred to hereafter as the "FC stack 12"), disposed in a vehicle front section 11, a transaxle 14 serving as an example of a "drive motor", an inverter 16, and a non-illustrated high pressure hydrogen tank and battery.

Figure 2:
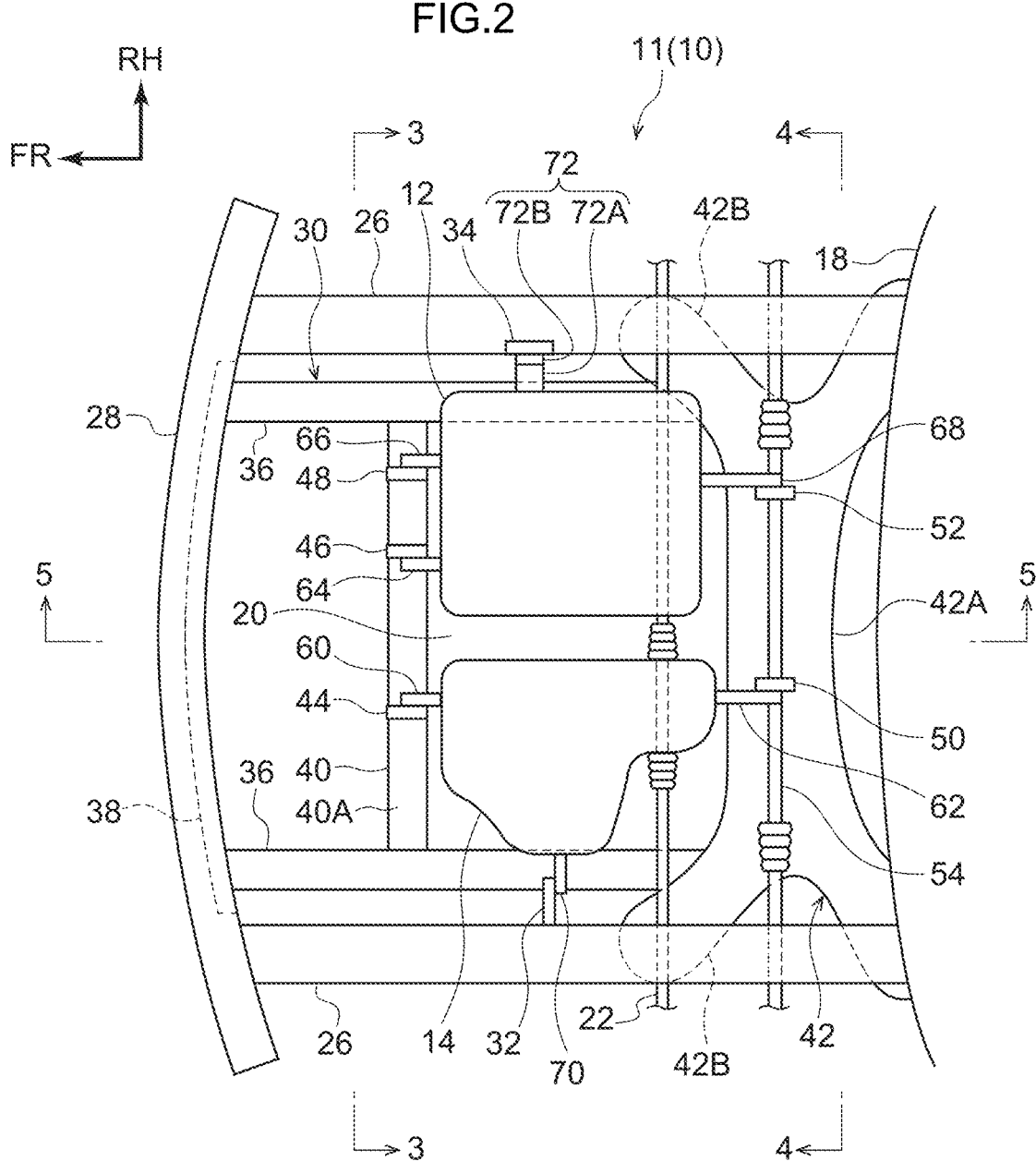
FIG. 2 is a plan view illustrating a fuel cell stack vehicle installation structure according to the first exemplary embodiment.

As illustrated in FIG. 2, the vehicle front section 11 is partitioned from a non-illustrated vehicle cabin by a dash panel 18. The FC stack 12 is disposed in a power unit compartment 20 of the vehicle front section 11, and has a stack structure in which individual fuel cells are arranged in plural layers. The individual fuel cells configuring the FC stack 12 generate electricity through an electrochemical reaction between hydrogen gas supplied from the non-illustrated high pressure hydrogen tanks and oxygen in air supplied by a non-illustrated air compressor.

The inverter 16 (see FIG. 1 and FIG. 5) converts the output of the FC stack 12 from direct current to an appropriate alternating current to drive the transaxle 14.

The transaxle 14 is disposed in the power unit compartment 20, and is configured including a non-illustrated motor body and motive force transmission mechanism. The motor body is driven by the output of the inverter 16, and the output of the motor body is transmitted to a drive shaft 22 through the motive force transmission mechanism. Namely, the output of the transaxle 14 is transmitted to front wheels 24 (see FIG. 1) through the drive shaft 22.

The vehicle front section 11 is configured including a pair of left and right front side members 26, serving as an example of a "pair of upper side members" extending along the vehicle front-rear direction, bumper reinforcement 28 fixed to non-illustrated crash boxes at front ends of the pair of front side members 26 and extending in the vehicle width direction, and a sub frame 30 serving as an example of a "framework member" disposed at a vehicle lower section. A left mount member 32 and a right mount member 34, serving as an example of "vibration isolating members", described later, are respectively fixed to the pair of front side members 26. The sub frame 30 will be described in detail later.

Vehicle Installation Structure for FC Stack 12

Explanation follows regarding a vehicle installation structure for the FC stack 12. As illustrated in FIG. 2, the vehicle installation structure for the FC stack 12 is configured including the sub frame 30 mentioned above, the FC stack 12 that is disposed toward the vehicle width direction right side of the vehicle front section 11 and that is elastically supported by the sub frame 30, and the transaxle 14 that is configured separately to the FC stack 12, that is disposed toward the vehicle width direction left side of the vehicle front section 11, and that is elastically supported by the sub frame 30.

The sub frame 30 is configured in a lattice shape, and includes a pair of left and right lower side members 36, lower reinforcement 38, a lower cross member 40, and a suspension member 42.

The pair of lower side members 36 are disposed further toward the vehicle lower side than the pair of front side members 26 and extend along the vehicle front-rear direction. Rear ends of the lower side members 36 are either joined to the suspension member 42 by welding, or fastened to the suspension member 42 using nuts and bolts.

The lower reinforcement 38 is disposed further toward to the vehicle lower side than the bumper reinforcement 28, is fixed to front ends of the pair of lower side members 36, and extends in the vehicle width direction.

The lower cross member 40 couples the pair of lower side members 36 together in the vehicle width direction further toward the vehicle rear side than the lower reinforcement 38.

Figure 4:
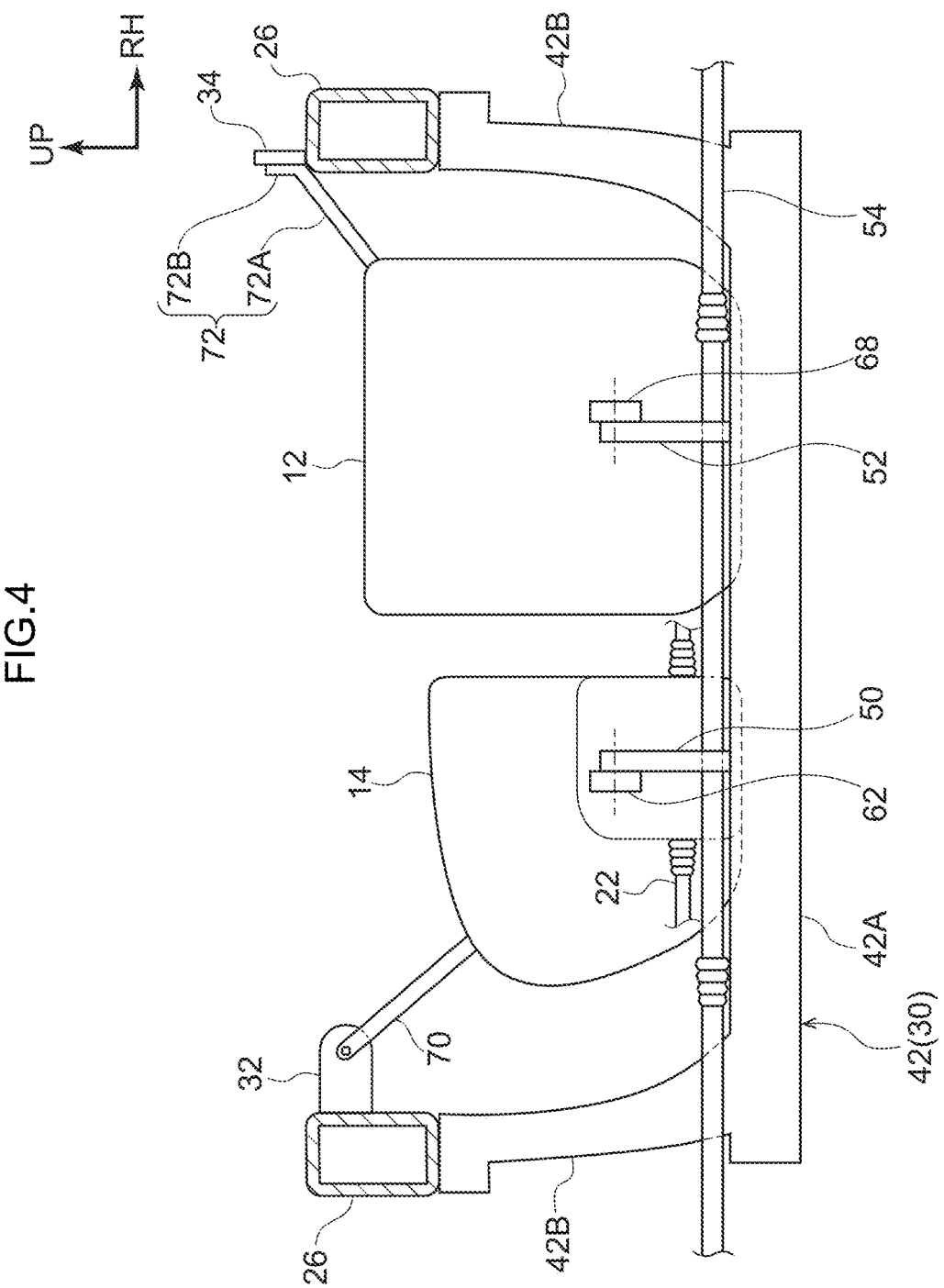
FIG. 4 is a cross-section illustrating a fuel cell stack vehicle installation structure as sectioned along line 4-4 in FIG. 2.

The suspension member 42 is configured including a main body 42A extending along the vehicle width direction in the vehicle lower section, and a pair of left and right arms 42B extending from the two vehicle width direction ends of the main body 42A toward the vehicle upper side (see FIG. 4). The pair of arms 42B are supported by the pair of front side members 26.

Note that in the present exemplary embodiment, the pair of front side members 26, the bumper reinforcement 28, the pair of lower side members 36, the lower reinforcement 38, and the lower cross member 40 are formed from extruded metal. However, each of these members may be configured with a hollow closed cross-section structure from two steel sheets joined by welding flanges thereof together.

Plural vibration isolating members are attached to the lower cross member 40 and the suspension member 42. Specifically, as illustrated in FIG. 2 and FIG. 3, a transaxle front mount member 44 (referred to hereafter as the "TA front mount member 44"), a first FC stack front mount member 46, and a second FC stack front mount member 48, serving as examples of "vibration isolating members" and each having a plate thickness direction oriented in the vehicle width direction, are respectively provided so as to stand upright from an upper face 40A of the lower cross member 40 toward the upper side.

Figure 5:
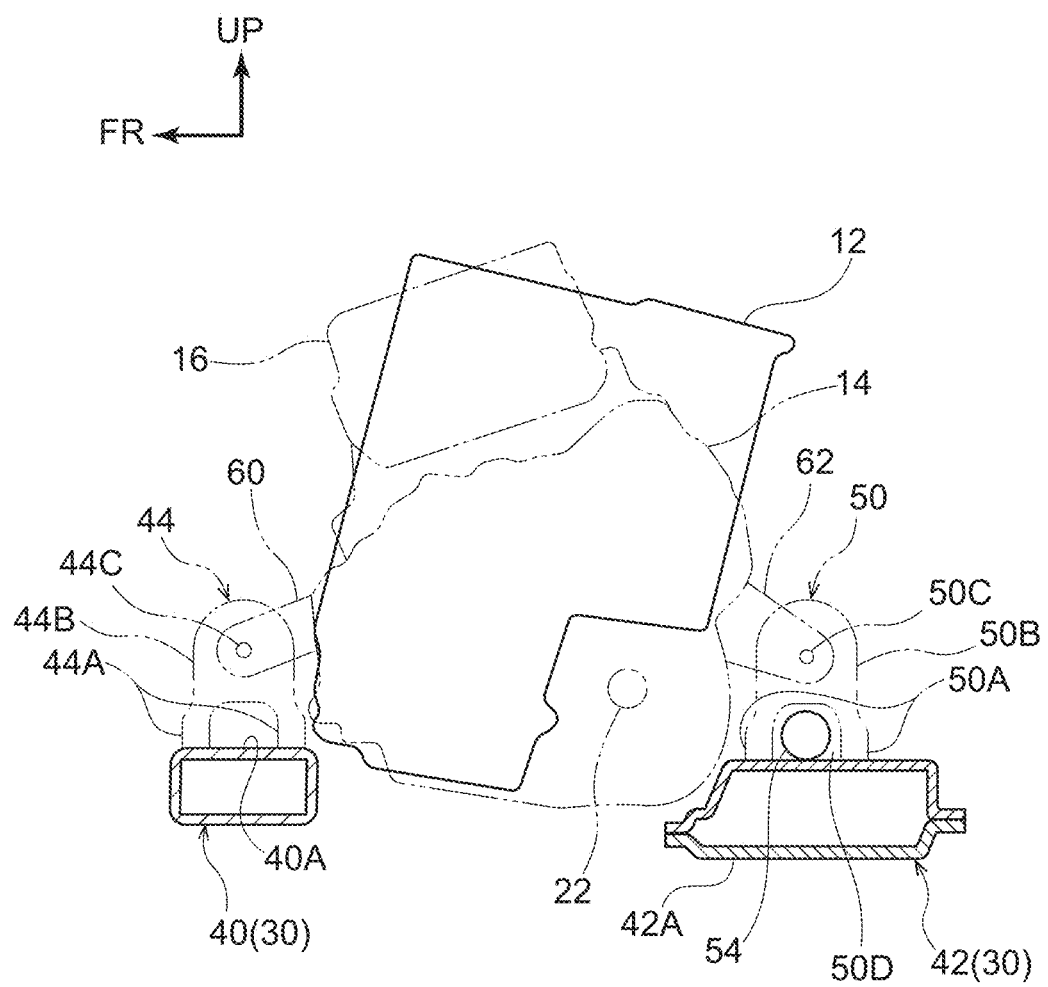
FIG. 5 is a cross-section illustrating a fuel cell stack vehicle installation structure as sectioned along line 5-5 in FIG. 2.

As illustrated in FIG. 5, the TA front mount member 44 is configured including a pair of legs 44A and a main body 44B. An insertion hole 44C is formed at the center of the main body 44B so as to allow insertion of a non-illustrated bolt. Non-illustrated vibration isolating rubber is provided around this bolt. The first FC stack front mount member 46 and the second FC stack front mount member 48 are configured similarly to the TA front mount member 44.

As illustrated in FIG. 2 and FIG. 4, a transaxle rear mount member 50 (referred to hereafter as the "TA rear mount member 50") and a FC stack rear mount member 52, serving as examples of "vibration isolating members" and each having a plate thickness direction oriented in the vehicle width direction, are respectively provided so as to stand upright from the main body 42A of the suspension member 42 toward the upper side. As illustrated in FIG. 5, the TA rear mount member 50 is configured including a pair of legs 50A, a main body 50B, and an insertion hole 50C. A steering gear 54 is inserted through an opening 50D between the pair of legs 50A. The FC stack rear mount member 52 is configured similarly to the TA rear mount member 50, and includes legs and a main body, not illustrated in the drawings.

Figure 3:
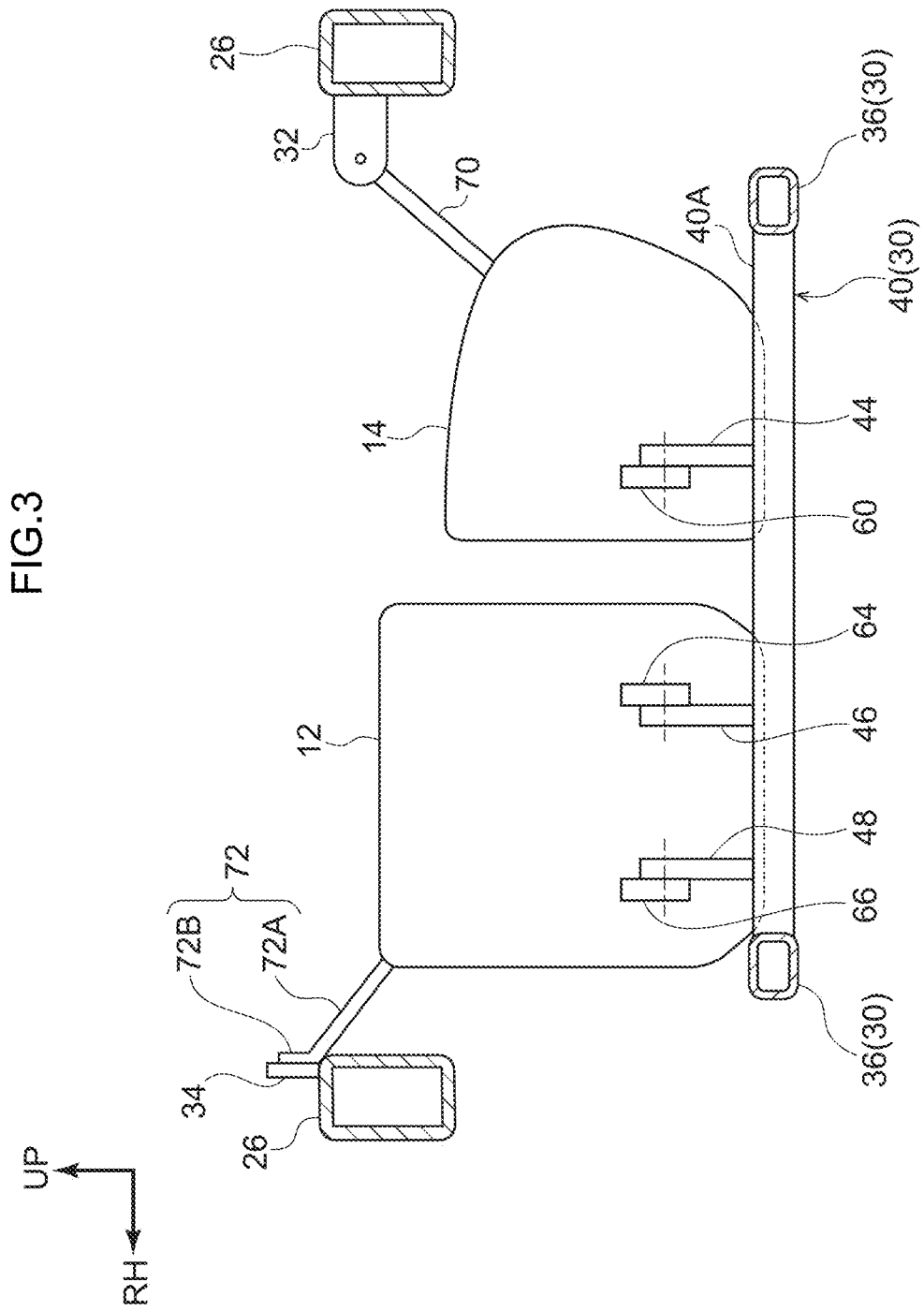
FIG. 3 is a cross-section illustrating a fuel cell stack vehicle installation structure as sectioned along line 3-3 in FIG. 2.

A front side end portion of the transaxle 14 in the vehicle front-rear direction is provided with a front bracket 60, as illustrated in FIG. 2, FIG. 3, and FIG. 5. The front bracket 60 has a plate thickness direction oriented in the vehicle width direction and projects from the transaxle 14 toward the vehicle front.

A rear side end portion of the transaxle 14 in the vehicle front-rear direction (an end portion on the vehicle front-rear direction inner side) is provided with a rear bracket 62 as illustrated in FIG. 2, FIG. 4 and FIG. 5. The rear bracket 62 has a plate thickness direction oriented in the vehicle width direction and projects from the transaxle 14 toward the vehicle rear.

The front bracket 60 is fastened to the TA front mount member 44 and the rear bracket 62 is fastened to the TA rear mount member 50, using non-illustrated nuts and bolts, such that the transaxle 14 is elastically supported by the sub frame 30. Note that as described above, the non-illustrated vibration isolating rubber is provided to the TA front mount member 44 and the TA rear mount member 50 to suppress vibration from the transaxle 14, thereby reducing vibration input to the lower cross member 40 and the suspension member 42 from the transaxle 14.

As illustrated in FIG. 2 and FIG. 3, a front side end portion of the FC stack 12 in the vehicle front-rear direction is provided with a first front bracket 64 and a second front bracket 66 (not illustrated in FIG. 5). Each of the first front bracket 64 and the second front bracket 66 has a plate thickness direction oriented in the vehicle width direction and projects from the FC stack 12 toward the vehicle front.

As illustrated in FIG. 2 and FIG. 4, a rear side end portion of the FC stack 12 in the vehicle front-rear direction (an end portion on the vehicle front-rear direction inner side) is provided with a rear bracket 68 (not illustrated in FIG. 5). The rear bracket 68 has a plate thickness direction oriented in the vehicle width direction and projects from the FC stack 12 toward the vehicle rear.

The first front bracket 64 and the second front bracket 66 are respectively fastened to the first FC stack front mount member 46 and the second FC stack front mount member 48 by non-illustrated nuts and bolts. The rear bracket 68 is fastened to the FC stack rear mount member 52 by non-illustrated nuts and bolts. The FC stack 12 is thus elastically supported by the sub frame 30, thereby reducing vibration transmission between the FC stack 12, the lower cross member 40, and the suspension member 42.

As illustrated in FIG. 2, the FC stack 12 and the transaxle 14 are configured separately to each other, and are respectively attached to the lower cross member 40 and the suspension member 42 so as to be spaced apart from each other.

The dimensions, attachment positions, projection directions, and the like of the front bracket 60, the rear bracket 62, the first front bracket 64, the second front bracket 66, and the rear bracket 68 are set such that a height position (a height direction position as measured from a ground contact face of a tire) of an upper end of the transaxle 14 is disposed between a height position of an upper end of the FC stack 12 and a height position of a lower end of the FC stack 12 as illustrated in FIG. 5. Moreover, the FC stack 12 and the transaxle 14 overlap each other in side view. In other words, a vehicle width direction inner side face of the FC stack 12 and a vehicle width direction inner side face of the transaxle 14 at least partially oppose each other.

As illustrated in FIG. 2 to FIG. 4, a left side bracket 70 is provided on the vehicle width direction left side of the transaxle 14. The left side bracket 70 has a plate thickness direction oriented in the vehicle front-rear direction and projects from the transaxle 14 toward the vehicle upper side and the vehicle width direction outer side. The left side bracket 70 is fastened to the left mount member 32 provided on the left front side member 26 using non-illustrated nuts and bolts. The left mount member 32 has a plate thickness direction oriented in the vehicle front-rear direction and projects from a vehicle width direction inner sidewall of the left front side member 26 toward the vehicle width direction inner side, and is provided with vibration isolating rubber, not illustrated in the drawings. The vibration isolating rubber suppresses vibration from the transaxle 14, thereby reducing vibration transmission between the transaxle 14 and the left front side member 26.

A right side bracket 72 is provided on the vehicle width direction right side of the FC stack 12. The right side bracket 72 is configured including an extension portion 72A projecting from the FC stack 12 toward the vehicle upper side and the vehicle width direction outer side, and an attachment portion 72B that has a plate thickness direction oriented in the vehicle width direction. The attachment portion 72B is fastened to the right mount member 34 provided to the right front side member 26 by non-illustrated nuts and bolts. The right mount member 34 has a plate thickness direction oriented in the vehicle width direction, and projects from the right front side member 26 toward the upper side. The right mount member 34 is provided with vibration isolating rubber, not illustrated in the drawings, similarly to the other vibration isolating members described above, thereby reducing vibration transmission between the FC stack 12 and the right front side member 26.

Vehicle Installation Method for FC Stack 12

Explanation follows regarding a vehicle installation method for the FC stack 12 of the first exemplary embodiment.

First, the FC stack 12 and the transaxle 14 are attached to the sub frame 30. Note that the sub frame 30 is configured as a substantially lattice shaped unit by fastening the pair of left and right lower side members 36, the lower reinforcement 38, the lower cross member 40, and the suspension member 42 together by welding or using non-illustrated nuts and bolts. The lower reinforcement 38 and the bumper reinforcement 28 configuring the sub frame 30 may be coupled together in advance, with the FC stack 12 and the transaxle 14 being attached to a frame configured in a shape resembling a hashtag by integrating the pair of left and right lower side members 36, the lower cross member 40, and the suspension member 42 into a single unit.

More specifically, the above process in which the FC stack 12 and the transaxle 14 are attached to the sub frame 30 includes a process in which the first front bracket 64 and the second front bracket 66 are respectively fastened to the first FC stack front mount member 46 and the second FC stack front mount member 48 in order to attach the FC stack 12 to the lower cross member 40, a process in which the rear bracket 68 is fastened to the FC stack rear mount member 52 in order to attach the FC stack 12 to the suspension member 42, a process in which the front bracket 60 is fastened to the TA front mount member 44 in order to attach the transaxle 14 to the lower cross member 40, and a process in which the rear bracket 62 is fastened to the TA rear mount member 50 in order to attach the transaxle 14 to the suspension member 42.

Note that the height position of the upper end of the transaxle 14 is disposed between the height position of the upper end and the height position of the lower end of the FC stack 12. The "height positions" referred to here refer to height direction positions as measured from the ground contact faces of the tires when the FC stack 12 and the transaxle 14 have been installed to the vehicle. The sequence of the respective processes to attach the FC stack 12 and the transaxle 14 to the lower cross member 40 and the suspension member 42 is not limited to the sequence described above.

Next, the sub frame 30 to which the FC stack 12 and the transaxle 14 are attached is in turn attached to the vehicle body from the vehicle lower side. Specifically, upper portions of the arms 42B of the suspension member 42 are fixed to lower faces of the pair of front side members 26 that configure part of the vehicle body. Note that in cases in which the lower reinforcement 38 of the sub frame 30 is coupled to the bumper reinforcement 28 in advance as described above, the pair of lower side members 36 are fastened to the lower reinforcement 38.

Next, the FC stack 12 and the transaxle 14 are respectively attached to the vehicle body. Specifically, the right side bracket 72 is fastened to the right mount member 34 to attach the FC stack 12 to the right front side member 26. The left side bracket 70 is fastened to the left mount member 32 to attach the transaxle 14 to the left front side member 26.

Operation and Advantageous Effects

Explanation follows regarding operation and advantageous effects of the vehicle installation structure for the FC stack 12 of the first exemplary embodiment.

In the vehicle installation structure for the FC stack 12 according to the present exemplary embodiment, as illustrated in FIG. 2 the FC stack 12 and the transaxle 14 disposed in the vehicle front section 11 are elastically supported by the sub frame 30 disposed at the vehicle lower side through the vibration isolating members (the TA front mount member 44, the first FC stack front mount member 46, the second FC stack front mount member 48, the TA rear mount member 50, and the FC stack rear mount member 52). Note that the height position of the upper end of the transaxle 14 is disposed between the height position of the upper end and the height position of the lower end of the FC stack 12 (see FIG. 5). This enables the height of the power unit compartment 20 to be suppressed in comparison to configurations in which a fuel cell stack is disposed further toward the vehicle upper side than the upper end of a transaxle. This enables the degrees of freedom for stylistic design of the vehicle to be improved as a result.

In the vehicle installation structure for the FC stack 12 according to the present exemplary embodiment, the FC stack 12 and the transaxle 14 are configured separately to each other, and are individually elastically supported by the sub frame 30. This enables vibration from the transaxle 14 to be prevented or suppressed from being input to the FC stack 12.

Generally, as the height of the center of gravity of a vehicle front section becomes higher, a principle axis of inertia of the vehicle front section moves away from the roll axis, causing greater tilting of the principle axis of inertia from the roll axis and thus being detrimental to balance, resulting in poor steering wheel operation and ride comfort. In the vehicle installation structure for the FC stack 12 according to the present exemplary embodiment, since the height position of the upper end of the transaxle 14 is disposed between the height position of the upper end and the height position of the lower end of the FC stack 12, the height of the center of gravity of the vehicle front section 11 is lower than it would be in a configuration in which a fuel cell stack is disposed further toward the vehicle upper side than the upper end of a transaxle. This enables steering wheel operation and ride comfort to be improved.

Moreover, in the vehicle installation structure for the FC stack 12 according to the present exemplary embodiment, the sub frame 30 is configured including the pair of left and right lower side members 36 extending along the vehicle front-rear direction, and the lower cross member 40 coupling the pair of lower side members 36 together in the vehicle width direction. The FC stack 12 and the transaxle 14 are elastically supported by the lower cross member 40 that extends in the vehicle width direction through the respective vibration isolating members (the TA front mount member 44, the first FC stack front mount member 46, and the second FC stack front mount member 48), thereby enabling high support rigidity to be obtained with respect to vibration in the vehicle front-rear direction.

In the vehicle installation structure for the FC stack 12 according to the present exemplary embodiment, as illustrated in FIG. 3, the pair of left and right front side members 26 extend in the vehicle front-rear direction further toward the vehicle upper side than the pair of lower side members 36, and the FC stack 12 and the transaxle 14 are elastically supported by the pair of front side members 26 through the vibration isolating members (the left mount member 32 and the right mount member 34). This enables high support rigidity to be obtained with respect to vibration in the vehicle width direction.

In the vehicle installation structure for the FC stack 12 according to the present exemplary embodiment, as illustrated in FIG. 2, the vehicle front-rear direction inner side end portions of the FC stack 12 and the transaxle 14 are elastically supported by the suspension member 42 configuring part of the sub frame 30 through the vibration isolating members (the TA rear mount member 50 and the FC stack rear mount member 52). There is accordingly no need to provide additional components in order to support the vehicle front-rear direction inner side end portions of the FC stack 12. This enables high support rigidity to be obtained with respect to vibration in the vehicle front-rear direction, without increasing the number of components.

In the vehicle installation method for the FC stack 12 according to the present exemplary embodiment, as illustrated in FIG. 2 and FIG. 5, the FC stack 12 and the transaxle 14 are attached to the sub frame 30 through the vibration isolating members (the TA front mount member 44, the first FC stack front mount member 46, the second FC stack front mount member 48, the TA rear mount member 50, and the FC stack rear mount member 52) such that the height position of the upper end of the transaxle 14 is disposed between the height position of the upper end and the height position of the lower end of the FC stack 12. This enables the degrees of freedom for stylistic design of the vehicle to be improved while suppressing the height of the power unit compartment 20 in comparison to cases in which the FC stack 12 is disposed further toward the upper side than the upper end of the transaxle 14.

The sub frame 30 to which the FC stack 12 and the transaxle 14 are attached is attached to the vehicle body from the vehicle lower side. Moreover, the FC stack 12 and the transaxle 14 are also attached to the vehicle body through the vibration isolating members (the left mount member 32 and the right mount member 34). Since the sub frame 30 to which the FC stack 12 and the transaxle 14 are attached is attached to the vehicle body from the vehicle lower side similarly to in a traditional gasoline-powered or hybrid vehicle, it is possible to employ a traditional vehicle production line for mixed production including fuel cell vehicles. This facilitates derivative vehicle model development, and enables manufacturing costs to be reduced as a result.

In the vehicle installation method of the FC stack 12 according to the present exemplary embodiment, as illustrated in FIG. 2 the sub frame 30 includes the pair of left and right lower side members 36 that extend in the vehicle front-rear direction when fixed to the vehicle body, the lower cross member 40 that couples the pair of lower side members 36 together in the vehicle width direction, and the suspension member 42 that is fixed to the vehicle front-rear direction inner side end portions of the pair of left and right lower side members 36. The FC stack 12 is attached to the lower cross member 40 and the suspension member 42 through the vibration isolating members, and the transaxle 14 is attached to the lower cross member 40 and the suspension member 42 through the vibration isolating members. The FC stack 12 and the transaxle 14 are respectively attached to the lower cross member 40 and the suspension member 42 that extend in the vehicle width direction in the sub frame 30 that is configured in a shape resembling a hashtag, thereby enabling more rigid attachment of the sub frame 30 with the FC stack 12 and the transaxle 14 attached thereto to the vehicle body. Moreover, in the vehicle 10 manufactured using this method, the FC stack 12 and the transaxle 14 are elastically supported through the respective vibration isolating members by the lower cross member 40 and the suspension member 42 that extend in the vehicle width direction, enabling high support rigidity to be obtained with respect to vibration in the vehicle front-rear direction.

In the vehicle installation method for the FC stack 12 according to the present exemplary embodiment, as illustrated in FIG. 2 to FIG. 4, the FC stack 12 and the transaxle 14 are attached to the pair of front side members 26 through the vibration isolating members (the left mount member 32 and the right mount member 34). This makes it possible for the attachment state to be visually inspected from the vehicle upper side. Moreover, in the vehicle 10 manufactured using this method, high support rigidity can be obtained with respect to vibration in the vehicle width direction.

Second Exemplary Embodiment

Figure 6:
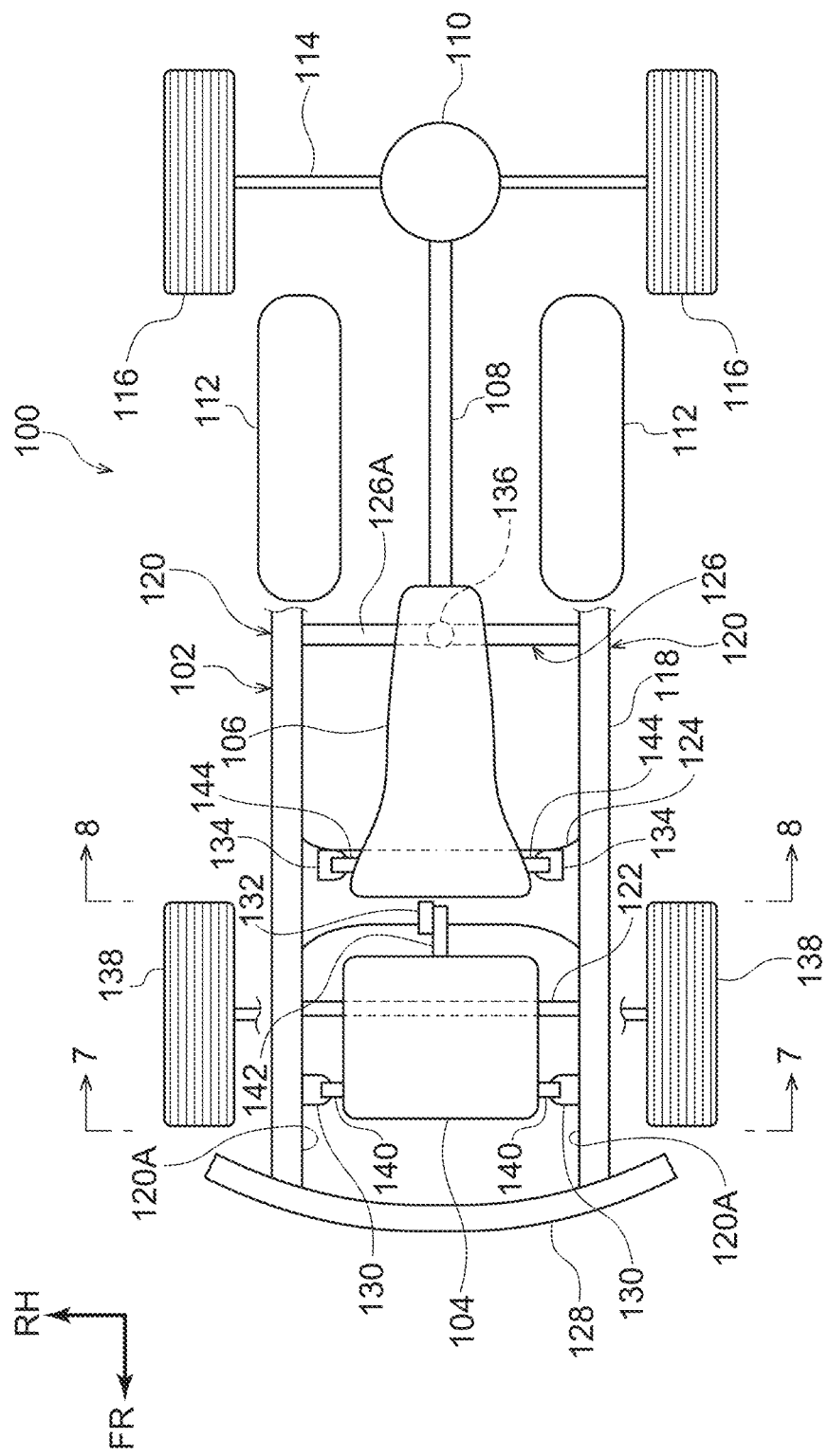
FIG. 6 is a plan view illustrating a fuel cell stack vehicle installation structure according to a second exemplary embodiment.
Figure 7:
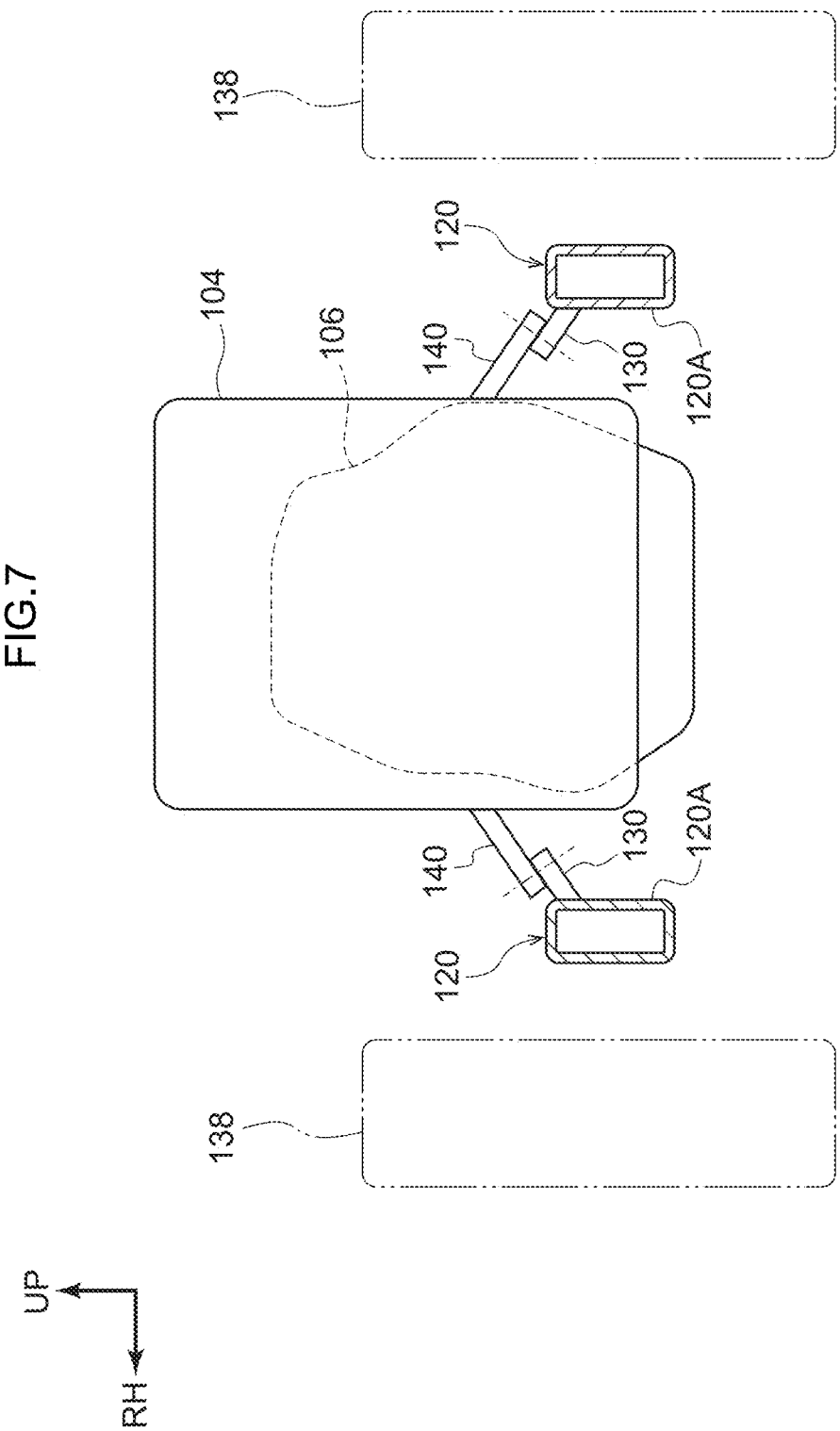
FIG. 7 is a cross-section illustrating a fuel cell stack vehicle installation structure as sectioned along line 7-7 in FIG. 6.
Figure 8:
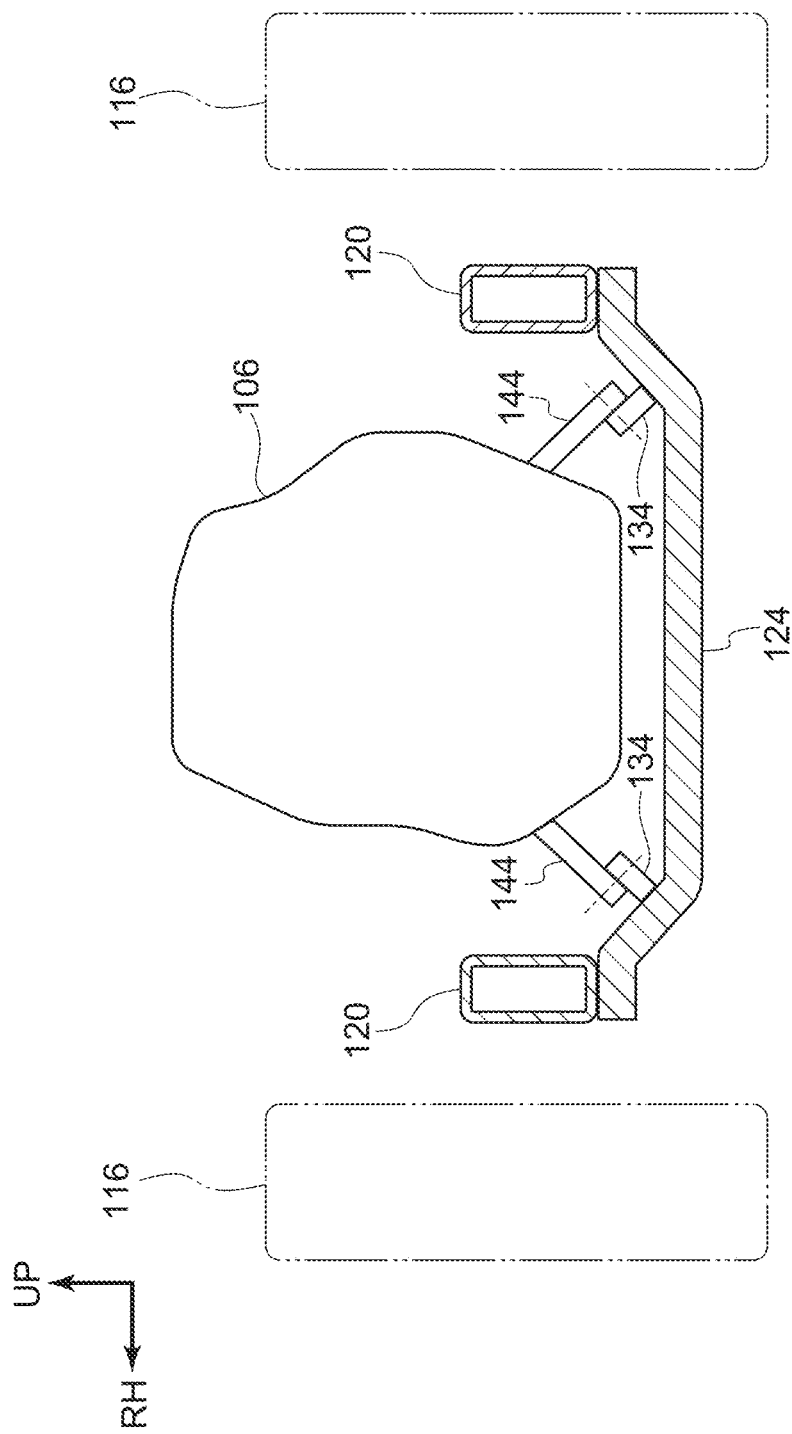
FIG. 8 is a cross-section illustrating a fuel cell stack vehicle installation structure as sectioned along line 8-8 in FIG. 6.

Explanation follows regarding a second exemplary embodiment, with reference to FIG. 6 to FIG. 8.

Overall Configuration of Vehicle

As illustrated in FIG. 6, a vehicle 100 applied with a fuel cell stack vehicle installation structure according to a second exemplary embodiment is configured as a body-on-frame type vehicle (for example a pickup truck) including a ladder shaped frame 102.

The vehicle 100 is configured including the frame 102 mentioned above, a fuel cell stack 104 (referred to hereafter as the "FC stack 104"), a transaxle 106 serving as an example of a "drive motor", a propeller shaft 108, a differential gear 110, high pressure hydrogen tanks 112, and a non-illustrated inverter and battery. The vehicle 100 is a rear-wheel drive vehicle in which output of the transaxle 106 is transmitted to rear wheels 116 through the propeller shaft 108, the differential gear 110, and a drive shaft 114.

Vehicle Installation Structure for FC Stack 104

Explanation follows regarding a vehicle installation structure for the FC stack 104. As illustrated in FIG. 6, the vehicle installation structure of the FC stack 104 is configured including the frame 102 mentioned above, the FC stack 104 elastically supported by a front section 118 of the frame 102, and the transaxle 106 that is configured separately to the FC stack 104 and is disposed further toward the vehicle rear side than the FC stack 104.

The frame 102 is configured in a substantially ladder shape by a pair of left and right side rails 120 extending along the vehicle front-rear direction, a first cross member 122, a second cross member 124, and a third cross member 126 coupling the pair of side rails 120 together in the vehicle width direction, and front bumper reinforcement 128 and non-illustrated rear bumper reinforcement respectively fixed to front ends and rear ends of the pair of side rails 120 and extending in the vehicle width direction.

A pair of FC stack mount members 130, serving as an example of "vibration isolating members" provided with non-illustrated vibration isolating rubber are fixed to sidewalls 120A on the vehicle width direction inner sides of the pair of side rails 120 as illustrated in FIG. 6 and FIG. 7. Each of the pair of FC stack mount members 130 has a plate thickness direction oriented in a direction inclined toward the vehicle width direction outer side with respect to the vehicle vertical direction, and projects from the corresponding sidewall 120A toward the vehicle width direction inner side and upper side.

As illustrated in FIG. 6, an FC stack rear mount member 132 and a pair of transaxle mount members 134 (referred to hereafter as the "pair of TA mount members 134"), serving as examples of "vibration isolating members" provided with non-illustrated vibration isolating rubber are fixed to the second cross member 124. The FC stack rear mount member 132 has a plate thickness direction oriented in the vehicle width direction, and projects upright from the second cross member 124 toward the upper side. As illustrated in FIG. 8, the pair of TA mount members 134 each has a plate thickness direction oriented in a direction inclined toward the vehicle width direction outer side with respect to the vehicle vertical direction, and projects from the second cross member 124 toward the vehicle width direction inner side and upper side.

As illustrated in FIG. 6, a transaxle rear mount member 136 (referred to hereafter as the "TA rear mount member 136") serving as an example of a "vibration isolating member" provided with non-illustrated vibration isolating rubber is fixed to the third cross member 126. The TA rear mount member 136 is configured in a substantially circular cylinder shape, and is fixed to an upper face 126A of the third cross member 126 with its axial direction running in the vehicle vertical direction.

The FC stack 104 is disposed between front wheels 138 at the front section 118 of the frame 102, and is elastically supported by the pair of side rails 120 and the second cross member 124. Specifically, as illustrated in FIG. 6 and FIG. 7, a front portion of the FC stack 104 is provided with a pair of left and right side brackets 140 projecting from side portions of the FC stack 104 toward the vehicle width direction outer sides and lower side. The pair of side brackets 140 are fastened to the pair of FC stack mount members 130 using non-illustrated nuts and bolts. A vehicle front-rear direction rear side end portion (vehicle front-rear direction inner side end portion) of the FC stack 104 is provided with a rear bracket 142 (not illustrated in FIG. 7) that has a plate thickness direction oriented in the vehicle width direction and projects toward the vehicle rear. The rear bracket 142 is fastened to the FC stack rear mount member 132 using non-illustrated nuts and bolts.

The transaxle 106 is elastically supported by the second cross member 124 and the third cross member 126 in the front section 118 of the frame 102. Specifically, as illustrated in FIG. 6 and FIG. 8, a front portion of the transaxle 106 is provided with a pair of left and right side brackets 144 projecting from side portions of the transaxle 106 toward the vehicle width direction outer sides and the lower side. The pair of side brackets 144 are fastened to the pair of TA mount members 134 using non-illustrated nuts and bolts. Moreover, the TA rear mount member 136 is coupled to a lower face of a rear portion of the transaxle 106. A height position of an upper end of the transaxle 106 is disposed between a height position of an upper end and a height position of a lower end of the FC stack 104 (see FIG. 7).

Operation and Advantageous Effects

Explanation follows regarding operation and advantageous effects of the vehicle installation structure for the FC stack 104 of the second exemplary embodiment.

In the vehicle installation structure for the FC stack 104 according to the present exemplary embodiment, as illustrated in FIG. 6, a framework member is configured by the frame 102 of the body-on-frame structure type vehicle 100. The FC stack 104 is disposed in the front section 118 of the frame 102, and the transaxle 106 is disposed further toward the vehicle rear side than the FC stack 104. The body-on-frame structure type vehicle 100 thus enables the height of the power unit compartment to be suppressed and enables the degrees of freedom for stylistic design of the vehicle to be improved in comparison to configurations in which a fuel cell stack is disposed further toward a vehicle upper side than the upper end of a drive motor.

In the vehicle installation structure for the FC stack 104 according to the present exemplary embodiment, the frame 102 includes the pair of left and right side rails 120 extending along the vehicle front-rear direction, and the second cross member 124 that couples the pair of side rails 120 together in the vehicle width direction. The FC stack 104 and the transaxle 106 are elastically supported by the second cross member 124 through the respective vibration isolating members, and the transaxle 106 is also elastically supported by the third cross member 126 through a vibration isolating member, thereby enabling high support rigidity to be obtained with respect to vibration in the vehicle front-rear direction.

Although explanation has been given regarding a vehicle installation structure and a vehicle installation method for a fuel cell stack in the above exemplary embodiments of the present disclosure, various modifications may be implemented within a range not departing from the spirit of the present disclosure. For example, in the examples given in the first exemplary embodiment and the second exemplary embodiment, the vehicle installation structure for the fuel cell stack is disposed in the vehicle front section. However, the vehicle installation structure may be disposed in a vehicle rear section. In cases in which the vehicle installation structure is disposed in the vehicle rear section, the configuration of the vehicle installation structure for the fuel cell stack will have front-rear symmetry to that described in the first exemplary embodiment or the second exemplary embodiment.

Although explanation has been given regarding an example in which the FC stack 12 is disposed on the vehicle right side and the transaxle 14 is disposed on the vehicle left side in the first exemplary embodiment, the FC stack 12 may be disposed on the vehicle left side, and the transaxle 14 may be disposed on the vehicle right side.

Although the height position of the upper end of the transaxle 14 is disposed between the height position of the upper end and the height position of the lower end of the FC stack 12 in the first exemplary embodiment (see FIG. 5), and the height position of the upper end of the transaxle 106 is disposed between the height position of the upper end and the height position of the lower end of the FC stack 104 in the second exemplary embodiment (see FIG. 7), the positional relationship between the FC stack and the transaxle in the height direction is not limited thereto. Namely, it is sufficient that the height position of at least one out of the upper end, lower end, or height direction center of the transaxle be disposed between the height position of the upper end and the height position of the lower end of the FC stack. For example, configuration may be made in which the height positions of both the upper end and the lower end of a transaxle are disposed between the height position of the upper end and the height position of the lower end of a FC stack, or configuration may be made in which only the height position of a lower end of a transaxle is disposed between the height position of the upper end and the height position of the lower end of a FC stack. Alternatively, configuration may be made in which a height dimension of a transaxle is larger than a height dimension of a fuel cell stack, and only the height position of the height direction center of the transaxle is disposed between the height position of the upper end and the height position of the lower end of the FC stack. In such cases, the height of the power unit compartment is still suppressed and the degrees of freedom for stylistic design of the vehicle can still be improved in comparison to configurations in which the FC stack is disposed further toward the vehicle upper side than the upper end of the transaxle.

Although explanation has been given regarding an example in which both the FC stack 12 and the transaxle 14 are supported by the pair of front side members 26 as illustrated in FIG. 2 to FIG. 4 in the first exemplary embodiment, configuration may be made in which either one out of the FC stack 12 or the transaxle 14 is supported by one out of the pair of lower side members 36 instead of by the pair of front side members 26.

Although the first exemplary embodiment has a configuration in which the FC stack 12 and the transaxle 14 overlap each other in side view as illustrated in FIG. 5, there is no limitation thereto, and it is sufficient that the height position of at least one out of the upper end, the lower end, or the height direction center of the transaxle 14 is disposed between the height position of the upper end and the height position of the lower end of the FC stack 12. For example, configuration may be made the FC stack 12 and the transaxle 14 do not overlap each other in side view, but do overlap each other when viewed face-on. Alternatively, configuration may be made in which the FC stack 12 and the transaxle 14 do not overlap each other either in side view or when viewed face-on.

Although the FC stack 104 and the transaxle 106 are supported by the same second cross member 124 in the second exemplary embodiment, configuration may be made in which the FC stack 104 and the transaxle 106 are supported by different cross members. Moreover, although configuration is made in which the front portion of the FC stack 104 is supported by the pair of side rails 120, configuration may be made in which the front portion of the FC stack 104 is supported by a cross member.

Although the vibration isolating members (with the exception of the transaxle rear mount member 136) are flat plate shaped members provided with vibration isolating rubber in the first exemplary embodiment and the second exemplary embodiment, the shape of the vibration isolating members is not limited flat plate shapes. The vibration isolating members may have different shapes to each other, and different vibration isolating members adapted for the characteristics of the device they support may be employed as the vibration isolating members.

What is claimed is:

1. A vehicle installation structure for a fuel cell stack, the vehicle installation structure comprising:
   a framework member that is disposed at a vehicle lower side;
   a fuel cell stack that is disposed at a vehicle front section or a vehicle rear section, and that is elastically supported by the framework member via a vibration isolating member; and
   a drive motor that is disposed at a same section of the vehicle front section or the vehicle rear section as the fuel cell stack, that is separate from the fuel cell stack, and that is elastically supported by the framework member via a second vibration isolating member such that a height position of at least one of an upper end, a lower end, or a height direction center of the drive motor is disposed between a height position of an upper end and a height position of a lower end of the fuel cell stack.

2. The vehicle installation structure for a fuel cell stack of claim 1, wherein:
   the framework member includes a pair of left and right lower side members extending along a vehicle front-rear direction, and a lower cross member coupling the pair of lower side members together in a vehicle width direction, and
   the fuel cell stack and the drive motor are elastically supported by the lower cross member via the respective vibration isolating members.

3. The vehicle installation structure for a fuel cell stack of claim 1, further comprising a pair of left and right upper side members located further toward a vehicle upper side than the framework member and extending in a vehicle front-rear direction, wherein
   at least one of the fuel cell stack or the drive motor is elastically supported by the pair of left and right upper side members via a third vibration isolating member.

4. The vehicle installation structure for a fuel cell stack of claim 1, wherein:
   the framework member includes a suspension member, and
   a vehicle front-rear direction inner side end portion of the fuel cell stack and a vehicle front-rear direction inner side end portion of the drive motor are elastically supported by the suspension member via the respective vibration isolating members.

5. The vehicle installation structure for a fuel cell stack of claim 1, wherein the framework member is a frame of a body-on-frame type vehicle, the fuel cell stack is disposed at a front section of the frame, and the drive motor is disposed further toward a vehicle rear side than the fuel cell stack.

6. The vehicle installation structure for a fuel cell stack of claim 5, wherein:
   the frame includes a pair of left and right side rails extending along a vehicle front-rear direction and a cross member coupling the pair of side rails together in a vehicle width direction, and
   the fuel cell stack and the drive motor are elastically supported by the cross member via the respective vibration isolating members.

7. The vehicle installation structure for a fuel cell stack of claim 6, wherein:
   the cross member includes a first cross member, a second cross member, and a third cross member arranged in the vehicle front-rear direction,
   the fuel cell stack is supported by the first cross member and the second cross member, and
   the drive motor is supported by the second cross member and the third cross member.

8. A method for installing a fuel cell stack at a vehicle, the method comprising:
   i) attaching a fuel cell stack and a drive motor to a framework member via a vibration isolating member such that a height position of at least one of an upper end, a lower end, or a height direction center of the drive motor is disposed between a height position of an upper end and a height position of a lower end of the fuel cell stack;
   ii) attaching the framework member to which the fuel cell stack and the drive motor are attached to a vehicle body from a vehicle lower side; and
   iii) attaching the fuel cell stack and the drive motor, respectively, to the vehicle body via a second vibration isolating member.

9. The method of claim 8, wherein:
   the framework member includes a pair of left and right lower side members extending along a vehicle front-rear direction when fixed to the vehicle body, a lower cross member coupling the pair of lower side members together in a vehicle width direction, and a suspension member fixed to vehicle front-rear direction inner side end portions of the pair of left and right lower side members, and
   attaching the fuel cell stack and the drive motor to the framework member via the vibration isolating member includes:

a) attaching the fuel cell stack to the lower cross member and the suspension member via the vibration isolating member; and
b) attaching the drive motor to the lower cross member and the suspension member via the vibration isolating member.

10. The method of claim 8, wherein attaching the fuel cell stack and the drive motor to the vehicle body via the vibration isolating member includes:

c) attaching the fuel cell stack and the drive motor to each of a pair of left and right upper side members via the vibration isolating member, the pair of left and right upper side members being located further toward a vehicle upper side than the framework member and extending along a vehicle front-rear direction.

* * * * *